US009475660B2

(12) United States Patent
Batrin et al.

(10) Patent No.: US 9,475,660 B2
(45) Date of Patent: Oct. 25, 2016

(54) PALLETIZER FOR CORRUGATED BUNDLES

(71) Applicant: Alliance Machine Systems International, LLC, St. Louis, MO (US)

(72) Inventors: Marius D. Batrin, Liberty Lake, WA (US); Curtis A. Roth, Post Falls, ID (US)

(73) Assignee: Alliance Machine Systems International, LLC, St. Louis, MO (US)

( * ) Notice: Subject to any disclaimer, the term of this patent is extended or adjusted under 35 U.S.C. 154(b) by 241 days.

(21) Appl. No.: 14/152,275

(22) Filed: Jan. 10, 2014

(65) Prior Publication Data
US 2014/0200712 A1   Jul. 17, 2014

Related U.S. Application Data

(60) Provisional application No. 61/751,620, filed on Jan. 11, 2013.

(51) Int. Cl.
  G06F 19/00    (2011.01)
  B65G 61/00    (2006.01)
  B65G 47/08    (2006.01)
(52) U.S. Cl.
  CPC ............. *B65G 61/00* (2013.01); *B65G 47/086* (2013.01); *Y10S 901/50* (2013.01)
(58) Field of Classification Search
  None
  See application file for complete search history.

(56) References Cited

U.S. PATENT DOCUMENTS

| 4,597,707 | A | | 7/1986 | Cornacchia | |
|---|---|---|---|---|---|
| 5,087,169 | A | | 2/1992 | Tubke | |
| 5,445,493 | A | * | 8/1995 | Yourgalite | B65G 61/00 198/374 |
| 5,794,416 | A | * | 8/1998 | Rahman | B65G 67/20 53/157 |
| 6,394,605 | B1 | * | 5/2002 | Campin | A61B 3/14 351/246 |
| 6,934,605 | B1 | * | 8/2005 | Dothan | G05B 19/41815 141/6 |
| 8,000,837 | B2 | * | 8/2011 | Allen | B65G 61/00 209/534 |
| 8,220,229 | B1 | * | 7/2012 | Pierson | B65G 47/086 414/791.6 |
| 2012/0039699 | A1 | * | 2/2012 | Ward | B25J 15/0052 414/792.7 |

FOREIGN PATENT DOCUMENTS

| WO | WO 2010/106529 | 9/2010 |
|---|---|---|
| WO | WO 2011/016968 | 2/2011 |

* cited by examiner

Primary Examiner — Yolanda Cumbess
(74) Attorney, Agent, or Firm — Thompson Coburn LLP

(57) ABSTRACT

Techniques that palletize bundles at high-speed. A robotic controller includes a vision system that determines a location and orientation of incoming bundles, a tracking system that communicates between the controller and a conveyor, and a robot that coordinates its movement with the bundles. The tracking system identifies the location and orientation of each bundle, informs the controller, and causes the robot to track its location and orientation with incoming bundles. The controller receives information on the location and orientation of each bundle. The controller instructs the robot to move in coordination with each incoming bundle, instructs the robot where and at what orientation to pick up the bundle, and instructs the robot how to move the bundle to a tier-and-stacking position. The controller can instruct the robot how to pick up each bundle on the fly as the bundle moves into range on the incoming conveyor.

20 Claims, 17 Drawing Sheets

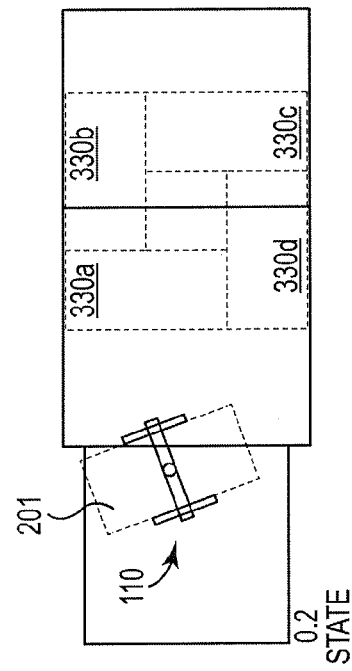
Fig. 3-1
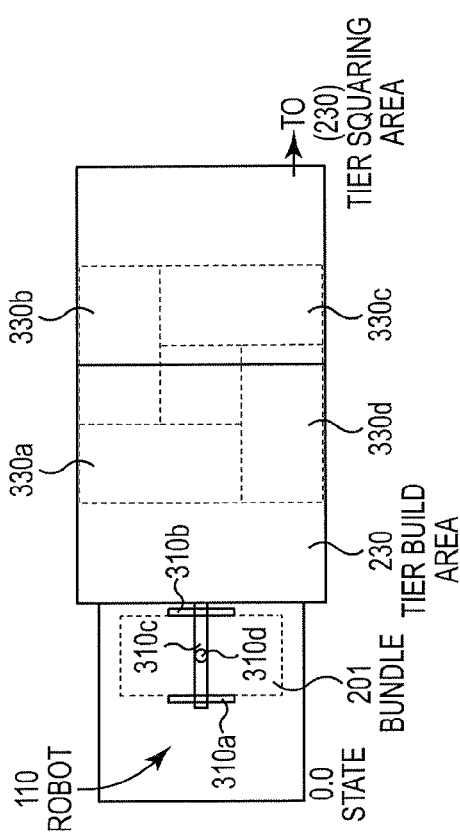
Fig. 3-2
Fig. 3-3
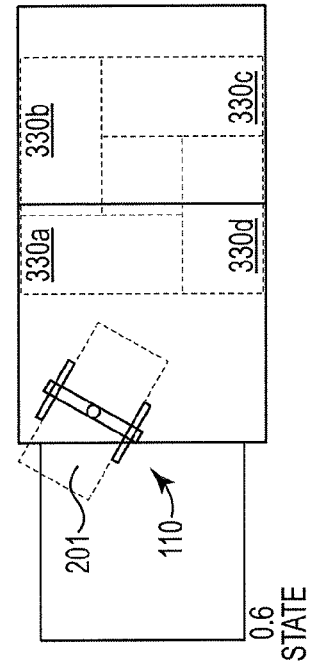
Fig. 3-4
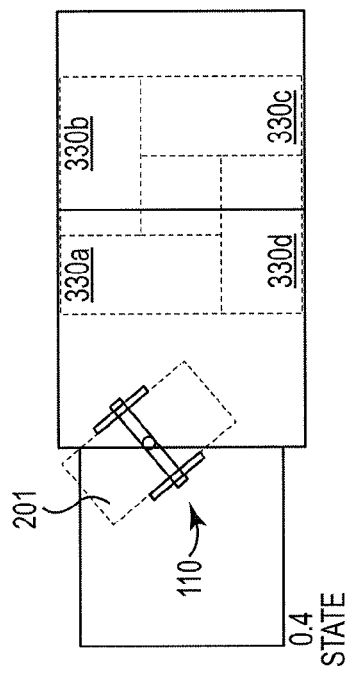

PALLETIZER FOR CORRUGATED BUNDLES

BACKGROUND

1. Field of the Disclosure

This application generally relates to palletizers, such as for corrugated bundles, and related matters.

2. Background of the Disclosure

Manufacturing operations often use conveyors to move products as they are produced, and after they are produced, onto a device where finished products are bundled and stacked onto a pallet. The latter type of device is sometimes called a "palletizer".

It sometimes occurs that stacking finished products involves a number of operations, such as rotating the bundle, positioning the bundle, and squaring its location with respect to the stack. This can mean that stacking bundles can take a relatively long time to occur, which can slow the production line, or alternatively, cause the stacking operation to produce lesser-quality stacks. This can cause difficulty when it is desired to stack bundles relatively quickly, such as when the production line is operating relatively quickly, or when a finishing device that is processing the bundles is operating relatively quickly.

It also sometimes occurs that stacking finished products involves placing the bundle onto a tier, such as organizing bundles into a pattern while they are stacked. This can occur when the bundles are placed in an arrangement other than a linear stack, such as to provide support in the event that the stack of bundles might sway or tilt. This can cause difficulty when combining tier placement and stacking, as another tier of bundles cannot generally be positioned until the stack of such tiers is "squared up" or otherwise stabilized.

Each of these examples, as well as other possible considerations, can cause difficulty in aspects of a manufacturing production system that includes an operation for relatively high-speed palletizing. This problem might be an issue when palletizing bundles for a relatively high-speed production line, or when palletizing bundles when a relatively high-speed finishing device is processing the bundles.

BRIEF SUMMARY OF THE DISCLOSURE

This application provides techniques that palletize bundles at relatively high-speed, even when the bundles are organized in tiers and stacked.

In one embodiment, a palletizer system includes tier placement elements, tier squaring elements, and tier stacking elements. For example, the tier placement elements can include robotic placement of bundles into layers or tiers, the tier squaring elements can include squaring-up elements, and the tier stacking elements can include elements for further stacking of tiers. By separating the tier placement elements from the tier squaring elements, the palletizer can operate at superior speed.

In one embodiment, a robotic controller element includes a vision system that determines a location and orientation of incoming bundles, an integrated conveyor tracking system that communicates between the robotic controller element and a movable bundle conveyor, and a robotic element that coordinates its movement with incoming bundles as they arrive on the conveyor. For example, the vision system can include a three dimensional (3D) vision system, a line scanner, a color vision system, or another system usable with relatively high-speed moving goods.

In one embodiment, the conveyor tracking system identifies the location and orientation of each incoming bundle on the conveyor, informs the robotic controller element of that location and orientation, and causes the robotic element to track its location and orientation with incoming bundles. The robotic controller element receives information with respect to the location and orientation of each incoming bundle. The robotic controller element instructs the robotic element to move in coordination with the location and orientation of the incoming bundle, instructs the robotic element with respect to where and at what orientation to pick up the bundle, and instructs the robotic element how to move the bundle to a tier-and-stacking position. For example, the robotic controller can instruct the robotic element how to pick up each bundle on the fly as the bundle moves into range on the incoming conveyor. Single layered or multi-layer tiers may be formed in the tier-and stacking position.

In one embodiment, once the robotic element has picked up the bundle and placed it in a tier-and-stacking position, the bundle can be conveyed to tier squaring elements, which can operate separately from the robotic element. The tier squaring elements can square-up the tier independently of the robotic element, which allows the robotic element to begin operation with another set of bundles, without waiting for the tier squaring elements to perform any functions. Completed stacks of bundles may be formed in a stack building area. In one embodiment, two or more previously formed multi-layered tiers may be gathered together and combined into a completed stack in the stack build area.

After reading this application, those skilled in the art would recognize that techniques shown in this application are applicable to fields and information other than bundle palletizing systems, robotic systems, or vision systems. In the context of the invention, there is no particular requirement for any such limitation. Moreover, after reading this application, those skilled in the art would recognize that techniques shown in this application are applicable to methods and systems other than those involving manufacturing of physical devices such as boxes or stackable materials. For example, other manufacturing contexts can include assembly lines, chemical processes, semiconductor manufacturing, and otherwise.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

FIG. 3-1 through 3-52 (collectively referred to as FIG. 3) show a conceptual drawing of a method of layering or tiering.

FIG. 4-1 through 4-2 (collectively referred to as FIG. 4) show a conceptual drawing of another method of layering or tiering.

FIG. 5 is a perspective view of a six-layered tier built in the tier build area using the method illustrated in the FIG. 4.

DETAILED DESCRIPTION

Example Robotic Controller System

Figure 1:
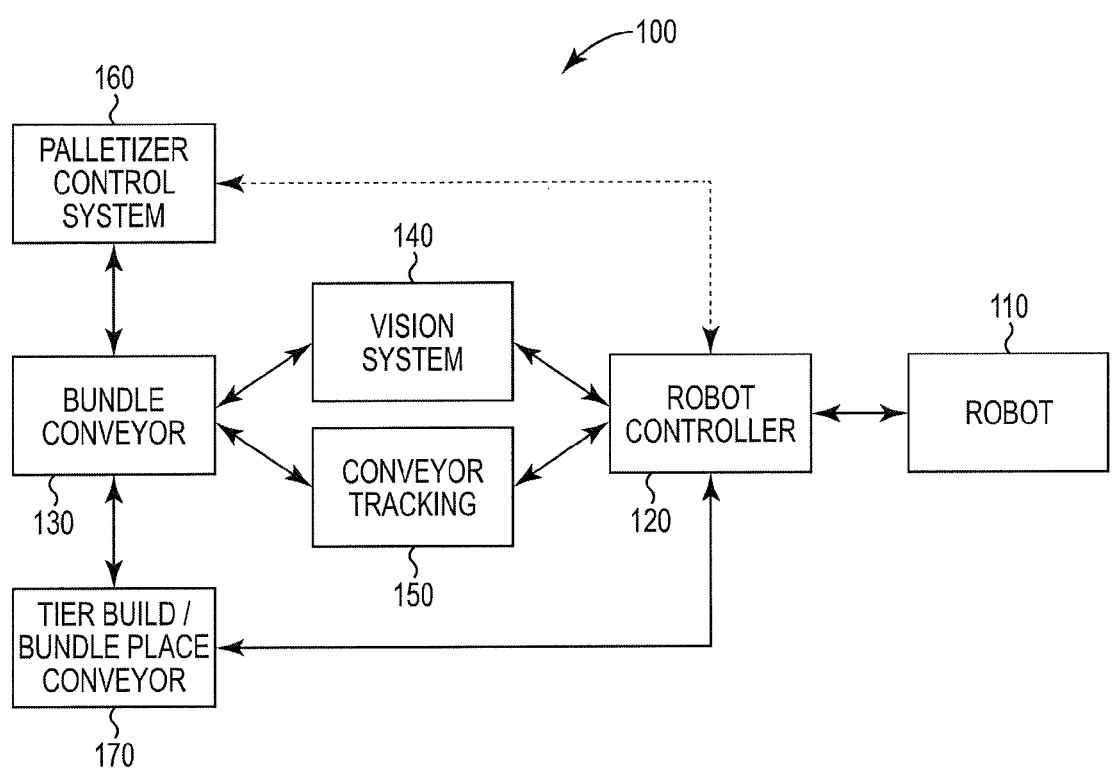
FIG. 1 shows a conceptual drawing of a robotic controller system.

FIG. 1 shows a conceptual drawing of a robotic controller system.

In one embodiment, a robotic controller system 100 can include elements as shown in the figure, including at least the following: a robot 110, a robot controller 120, a bundle conveyor 130, a vision system 140, a conveyor tracking system 150, a palletizer control system 160, a tier build conveyor 170, and possibly other elements.

Robotic Elements.

In one embodiment, the robot 110 can include one or more robotic arms that can grip one or more bundles and lift them from an incoming conveyor. The one or more robotic arms can each include a grabbing apparatus (not shown in FIG. 1), such as a fork or a friction gripper, that can seize each bundle in turn and remove that bundle from the conveyor. The one or more robotic arms can each include a lifting apparatus (not shown in FIG. 1), such as a hydraulic arm that can raise or lower the bundles, such as once they are gripped, and move them upward from the conveyor. The one or more robotic arms can each include a rotating or translating apparatus (not shown in FIG. 1) that can move the bundles from the conveyor, such as once they are lifted from the conveyor, to another location. References herein to lifting bundles are to be understood to refer to any suitable method for gripping and moving bundles. For example, in some embodiments, lifting bundles refers to sliding bundles into position, and in other contexts, lifting can refer to raising by any desired or suitable amount, including between about 0 inches and about 6 inches or higher, between about 0 inches and about 3 inches, between about 0.25 inches and 2 inches, or about 0.5 inches.

In alternative embodiments, the robot 110 can include a zero (or low) pressure accumulation conveyor, such as one or more vacuum grip elements disposed to seize bundles or sets of flat sheets, in the event that ordinary procedures for gripping and moving bundles are interrupted or slowed. For example, if bundles are stacked properly by the palletizer, but a post-palletizer finishing process is interrupted or otherwise slowed to a point that stacking is interrupted, a variable speed robot 110 can resequence the bundles in response to the interruption. In such cases, the variable speed robot 110 can include a zero (or low) pressure accumulation conveyor, or both a zero (or low) pressure accumulation conveyor and one or more robotic arms with gripping apparatus.

In one embodiment, the robot 110 can operate under the control of the robot controller 120. The robot controller 120 can include a processor, program and data memory (such as non-transitory memory or mass storage), and instructions. The instructions can be maintained in the program and data memory and interpretable by the processor to alter the state of the robot controller 120, to direct the robot 110 to perform one or more actions, or otherwise. For example, the robot controller 120 can include a personal computer (PC) or a programmable logic controller (PLC). The PLC or PC can be coupled to the robot 110 and be disposed to receive status information from the robot 110, and to send control signals or other information to the robot 110. This can have the effect of directing the robot 110 to move and to otherwise change state as directed by the robot controller 120.

In one embodiment, the bundle conveyor 130 (herein sometimes called just a "conveyor") includes devices and structure capable of moving bundles toward the robotic controller system 100, such as bringing bundles in from a relatively remote area, such as another device or processing station. For example, the conveyor 130 can include a moving belt, such as a continuous belt having a top side and a bottom side, disposed in a substantially continuous loop, or a slanted pathway, such as including rollers or ball belts that allow bundles to roll or slide from a device toward the robotic controller system 100, or otherwise. In such examples, bundles are positioned on the conveyor 130, which moves them toward the robotic controller system 100.

In one embodiment, the vision system 140 can include one or more devices that view bundles as they are conveyed by the conveyor 130. For example, the vision system 130 can include an external sensor that can recognize one or more bundles as distinct objects, and can identify the relative location and the relative orientation of those bundles with respect to the robot 110 and each other. In such examples, the vision system 130 can include a three dimensional (3D) vision sensor, such as can be disposed to identify lines, occlusion, shadows, and other indicia of solid objects. This can have the effect of providing information with respect to locations of one or more bundles, and orientation of one or more bundles.

In one embodiment, the vision system 140 can operate with respect to individual bundles, or can operate with respect to pairs of bundles (such as when bundles are conveyed by the conveyor 130 in pairs), or with respect to other numbers of bundles. In alternative embodiments, the vision system 140 can operate to identify the amount and shape of spaces between bundles. This can have the effect that the robotic controller system 100 can identify the location of bundles in response to an amount of spacing, and the orientation of bundles in response to a shape of the spaces between bundles.

In one embodiment, the conveyor tracking system 150 can include one or more devices that move the robot 110 with respect to the conveyor 130, so as to maintain the robot 110 in generally the same relative position with respect to one or more bundles. For example, as a bundle is moved by the conveyor 130, the conveyor tracking system 150 can move the robot 110 at generally the same speed and in substantially the same direction as the bundle.

This can first have the effect that the robot 110 maintains a position that allows the robot 110 to grip and pick up the bundle from the conveyor 130, with relatively rapid speed, without first having to position the robot 110 with respect to the bundle. This can second have the effect that the robot 110 can pick the bundle from the conveyor 130, without having to match speed or orientation between the robot 110 and the bundle as the latter is moved on the conveyor 130. These can have the effect of substantially reducing latency with respect to picking the bundle from the conveyor 130, when the robot controller 120 directs the robot 110 to pick the bundle.

Figure 2:
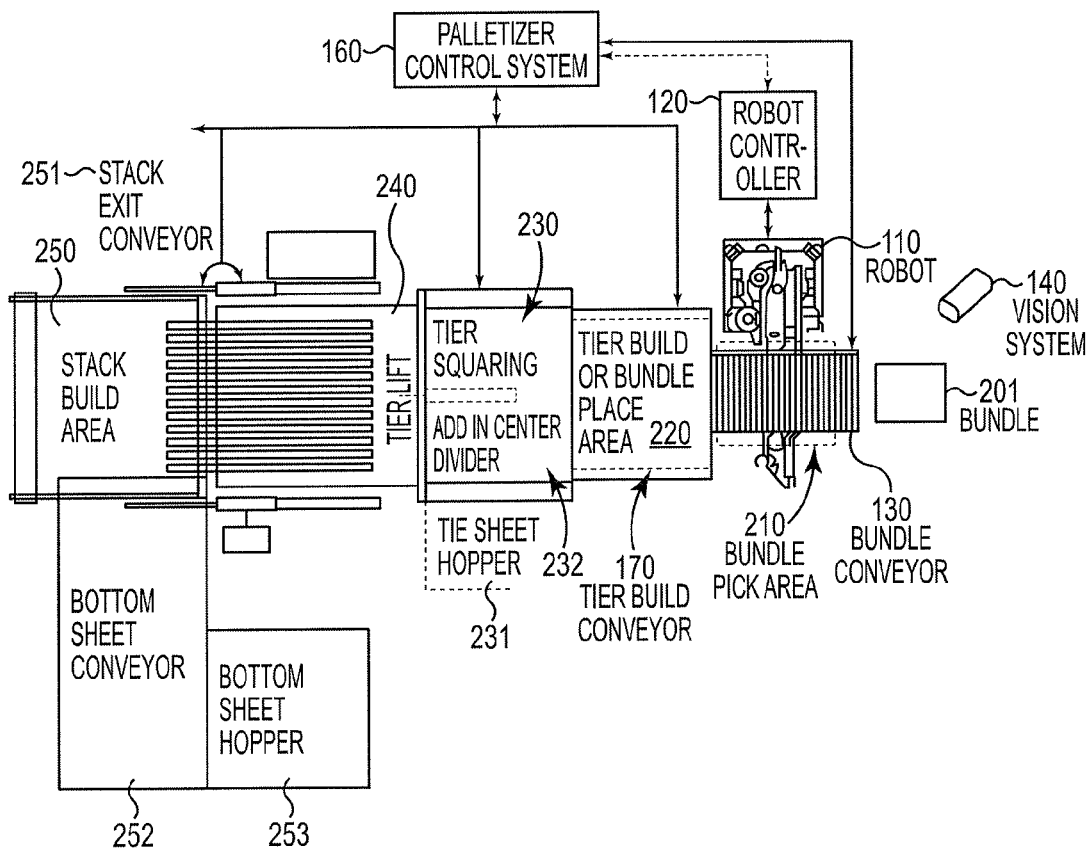
FIG. 2 shows a conceptual drawing of a palletizer.

In one embodiment, the palletizer control system 160 can include devices and structures as described herein, such as with respect to FIG. 2. For example, the palletizer control system 160 can include a control system disposed to cause elements of the palletizer to perform method steps or other techniques as described herein. In such examples, the palletizer control system 160 can include a processor and program and data memory, the program and data memory including instructions interpretable by the processor to direct the palletizer, its devices, or other devices, to perform method steps as described herein.

In one embodiment, the tier build conveyor 170 can include devices and structures as described herein, such as with respect to FIG. 2. For example, the tier build conveyor 170 can include a conveyor disposed to receive bundles placed by the robot 110, allow the robot 110 to position those bundles in tiers, and move those tiers to downstream devices and structures in the palletizer.

Example Palletizer

FIG. 2 shows a conceptual drawing of a palletizer.

In one embodiment, a palletizer can include elements as shown in the figure, including at least the following: the robot 110, robot controller 120, bundle conveyor 130, vision system 140, palletizer control system 160, and tier build conveyor 170, such as described above with respect to FIG. 1. The palletizer can also include one or more of a bundle pick area 210, a tier build area 220, a tier squaring area 230, a tie sheet hopper 231, a tier center divider 232, a tier lift element 240, a stack build area 250, a stack exit conveyor 251, a bottom sheet conveyor 252, a bottom sheet hopper 253, and possibly other elements.

In one embodiment, as described herein, the palletizer can operate with respect to one or more incoming bundles 201.

PALLETIZER CONTROL SYSTEM. In one embodiment, the palletizer control system 160, as described below, can identify the location and orientation of the bundles 201 as they are conveyed into the palletizer.

The palletizer control system 160 can receive the bundles 201 from the conveyor 130, such as at the bundle pick area 210. As the bundles 201 are moved by the conveyor 130, the bundles 201 are identified by the vision system 140, which can identify the location and orientation of those bundles 201. For example, the bundle pick area 210 can include a region in which the vision system 140 operates, or in which the vision system 140 can determine the presence of bundles 201, or in which the vision system 140 can determine the location or orientation (or both) of bundles 201.

In one embodiment, the bundles 201 can be placed in one or more identifiable specified locations, with the effect that the vision system 140 can relatively easily identify the bundles 201 as or when they arrive in the bundle pick area 210. This can have the effect that the bundles 201 are restricted to one of only a relatively few possible locations and orientations in the bundle pick area 210. For a first example, the bundles 201 can arrive or be placed in a sequence of detents, trays, or other apparatus that maintains the bundles 201 in relatively well-known locations and orientations. For a second example, the bundles 201 can be spaced as they arrive, with the effect that each pair of those bundles can be relatively easily distinguished.

In a first set of such examples, the bundles 201 can arrive or be placed in such relatively few possible locations and orientations before they arrive in the bundle pick area 210, such as while they are on the conveyor 130. In a second set of such examples, the bundles 201 can arrive or be placed in such relatively few possible locations and orientations as (or after) they arrive in the bundle pick area 210, such as in response to a device or structure within the bundle pick area 210. This can have the effects that the vision system is subject to relatively fewer errors in identifying bundles 201, or that the vision system is subject to relatively fewer errors in identifying the location and orientation of those bundles 201.

In one embodiment, the palletizer control system 160 can pick up the bundles 201 from the conveyor 130. For example, as described herein, the palletizer control system 160 can include one or more robotic arms (not shown) that can grip one or more bundles 201 and lift them from the conveyor 130. The one or more robotic arms can each include a grabbing apparatus, such as a fork or a friction gripper, that can seize each bundle 201 in turn and remove that bundle 201 from the conveyor 130. The one or more robotic arms can each include a lifting apparatus, such as a hydraulic arm that can raise or lower the bundles 201, such as once they are gripped, and move them upward from the conveyor 130. The one or more robotic arms can each include a rotating or translating apparatus that can move the bundles 201 from the conveyor 130, such as once they are lifted from the conveyor 130, to another location.

In one embodiment, the palletizer control system 160 can place the bundles 201 in the tier build area 220. For example, the palletizer control system 160 can use the one or more robotic arms to stack the bundles 201 in one or more patterns, each pattern forming a layer or tier, such as described with respect to FIG. 3. In some examples, the palletizer control system 160 can use the one or more robotic arms to stack the bundles 201 in parallel, such as seizing more than one such bundle 201 from the conveyor 130 and moving the more than one such bundle 201 into the layer or tier concurrently.

In a first set of alternative examples, the palletizer control system 160 can use the one or more robotic arms to stack the bundles 201 in sequence. For a first example, the robotic arms can seize one such bundle 201 at a time from the conveyor 130 and move that one such bundle 201 in its turn into the layer or tier. For a second example, the robotic arms can seize both a first and second such bundle 201 from the conveyor 130. In such second examples, the robotic arms can seize a first bundle 201, lift it, seize a second bundle 201, position the first bundle 201 above the second bundle 201, and move the first and second bundle 201 together to the layer or tier. In other examples, the robotic arms can pick up two or more bundles side-by-side, perhaps with a support such as a shelf under one more of the bundles.

In a second set of alternative examples, the palletizer control system 160 can use the one or more robotic arms to stack the bundles 201 either in parallel or sequence, depending on circumstances. For example, the palletizer control system 160 can be responsive to one or more of the following. (A) The palletizer control system 160 can decide to act in parallel or sequence in response to the space between bundles 201. (B) The palletizer control system 160 can decide to act in parallel or sequence in response to the timing between arrival of bundles 201. (C) The palletizer control system 160 can decide to act in parallel or sequence in response to the number of spaces for such bundles 201 available in each layer or tier. (D) The palletizer control system 160 can decide to act in parallel or sequence in response to some combination or conjunction of factors, or in response to other factors.

LAYERS, TIERS, AND STACKS. In one embodiment, the tier build area 220 can include a first tier conveyor that, upon completion of a stack of layers or tiers, moves the stack of layers or tiers into the tier squaring area 230. The tier squaring area 230 can include a region that allows devices or structure to cause each stack of layers or tiers to be "squared up." This can have the effect of causing each stack of layers or tiers to have a relatively well-ordered set of bundled, each relatively well-positioned with respect to a center of gravity, and each having a relatively smooth set of edges or sides. In such cases in which each bundle 201 includes sheets of corrugated cardboard material, or includes a stack of other relatively flat sheets of material (such as metal, plastic, or thin wood), this can have the effect of smoothing the sides of each stack to prevent excess material, ridges, or other protrusions that might cause one or more individual sheets to be damaged by other processes.

In one embodiment, the tier squaring area 230 can be coupled to a tie sheet hopper 231. The tie sheet hopper 231 can maintain and dispense tie sheets (not shown) that can be placed under each stack before that stack is squared up and tied. This can have the effect that the bottom of each stack (such as the bottom layer or tier, or the bottom sheet) is protected against foreign object damage, protected against damage from components of one or more conveyors, or otherwise.

In one embodiment, the tier squaring area 230 can include an (optional) tier center divider 232, or other separator devices or structures, or other collating or collecting devices or structures. This can have the effect that the tier squaring area 220 can provide separation of stacks into substacks, or collection of stacks into superstacks, some combination or conjunction thereof, or otherwise.

In one embodiment, the tier squaring area 230 can include second tier conveyor that, upon tying of a stack, can move the stack onto the stack build area 250. The stack build area 250 can include a region that allows multiple stacks to be collected, such as for dispensing onto one or more pallets that can transport the stacks out of the production area. For example, completed stacks can be transported out of the production area and toward a loading region, where the stacks can be loaded onto transportation. Tiers can be built as part stacks, or tiers can be built and then moved or assembled into stacks.

In one embodiment, the stack build area 250 can be coupled to a stack exit conveyor 251 that can move stacks from the stack build area 250 to a location from which those stacks can be transported. For example, stacks can be transported from the stack exit conveyor 251 using one or more forklifts or other equipment.

In one embodiment, the stack build area 250 can be coupled to a bottom sheet conveyor 252 that can move bottom sheets under each stack before that stack is transported. Alternatively, in one embodiment the invention can be used to dispense pallets, and in another embodiment, pallets with bottom sheets could be dispensed. This can have the effect that the bottom of each stack (such as the bottom layer or tier, or the bottom sheet) is protected against foreign object damage, protected against damage from components of one or more conveyors, or otherwise. The bottom sheet conveyor 252 can be coupled to a bottom sheet hopper 253 that can maintain and dispense those bottom sheets, with the effect that the bottom sheet conveyor 252 can move one or more bottom sheets to the stack build area 250 before each stack is built in the stack build area 250.

Figures 3, 4, 5:
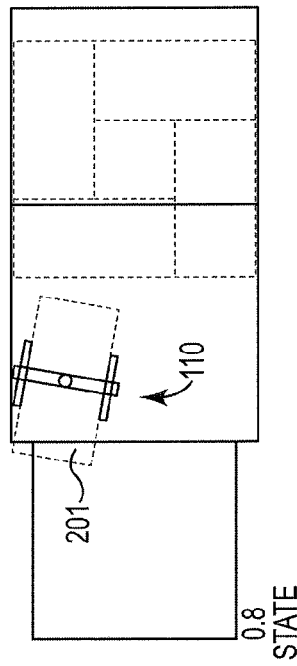
Figures 3, 4, 5, 6:
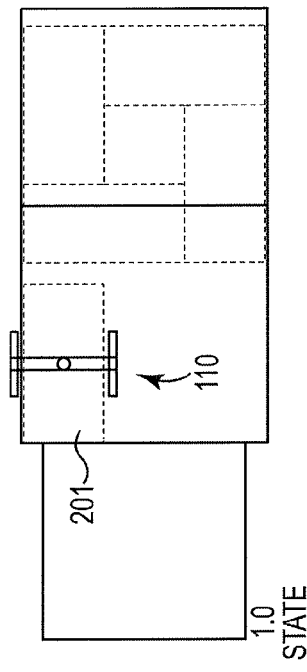
Figures 3, 4, 5, 6, 7:
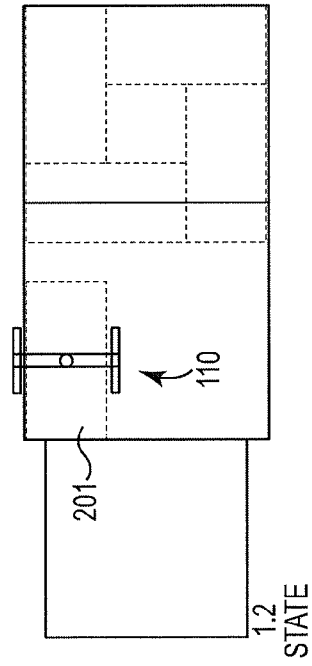
Figures 3, 4, 5, 6, 7, 8:
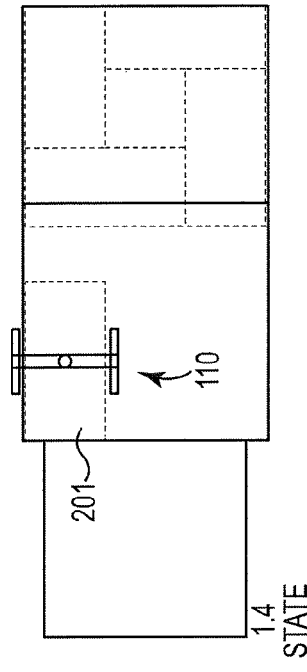
Figures 3, 4, 5, 6, 7, 8, 9:
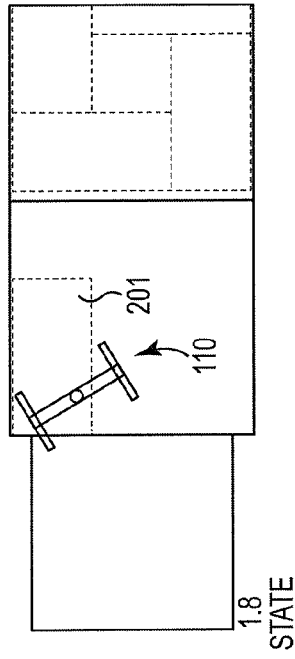
Figures 3, 4, 5, 6, 7, 8, 9, 10:
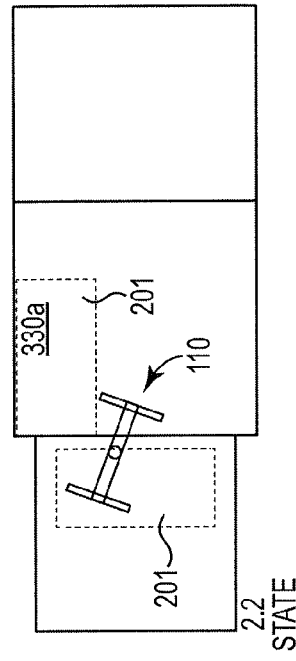
Figures 3, 4, 5, 6, 7, 8, 9, 10, 11:
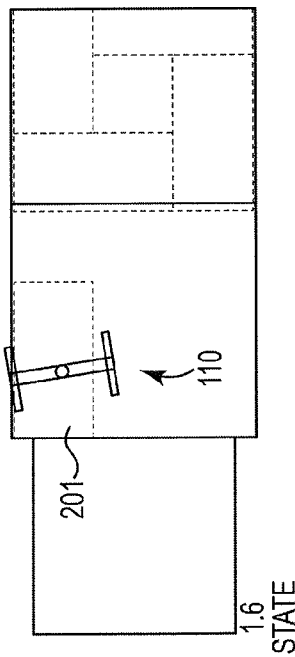
Figures 3, 4, 5, 6, 7, 8, 9, 10, 11, 12:
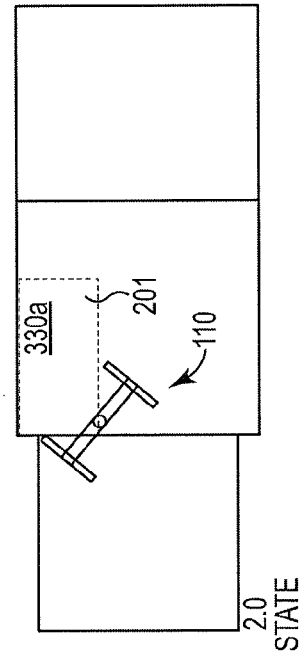
Figures 3, 4, 5, 6, 7, 8, 9, 10, 11, 12, 13:
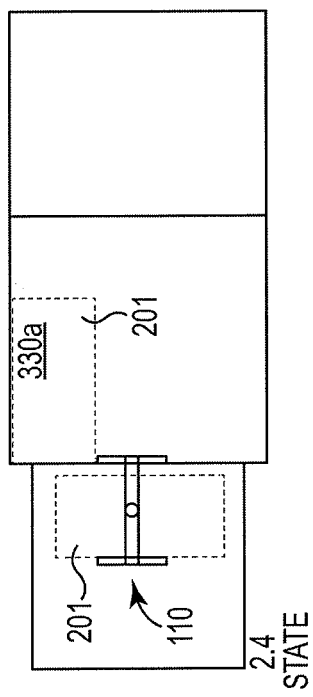
Figures 3, 4, 5, 6, 7, 8, 9, 10, 11, 12, 13, 14:
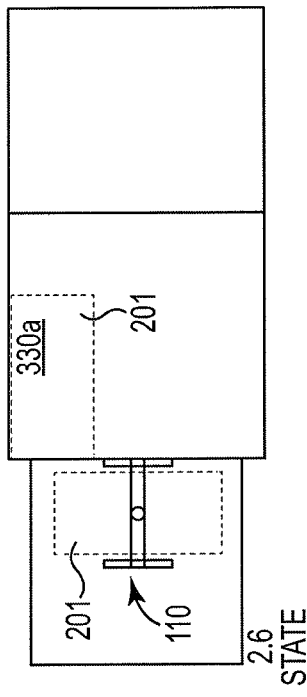
Figures 3, 4, 5, 6, 7, 8, 9, 10, 11, 12, 13, 14, 15:
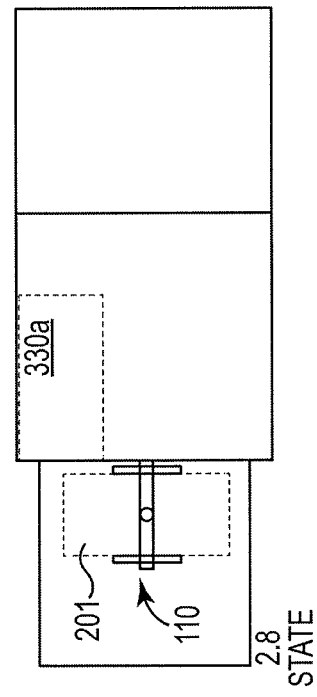
Figures 3, 4, 5, 6, 7, 8, 9, 10, 11, 12, 13, 14, 15, 16:
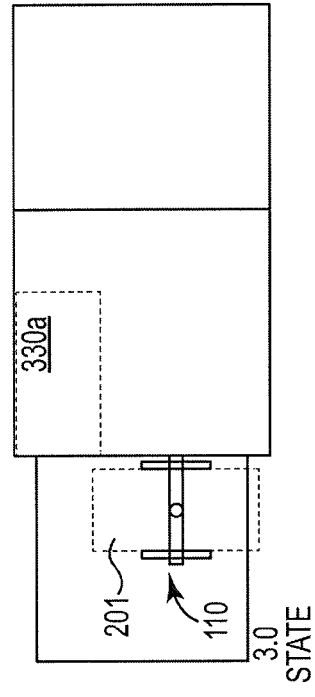
Figures 3, 4, 5, 6, 7, 8, 9, 10, 11, 12, 13, 14, 15, 16, 17:
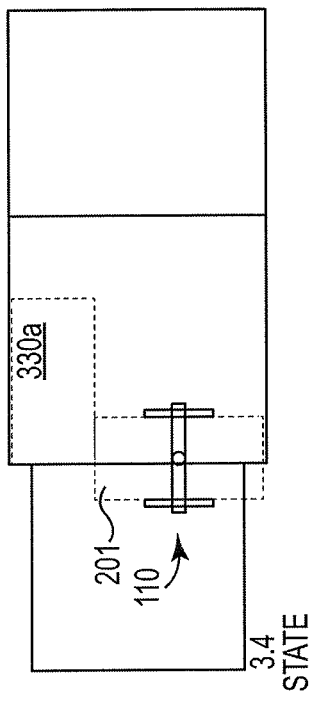
Figures 3, 4, 5, 6, 7, 8, 9, 10, 11, 12, 13, 14, 15, 16, 17, 18:
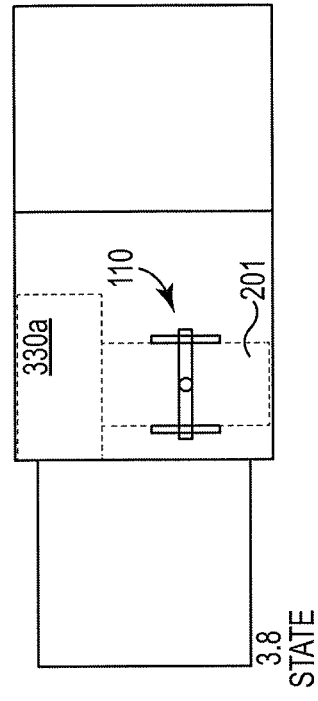
Figures 3, 4, 5, 6, 7, 8, 9, 10, 11, 12, 13, 14, 15, 16, 17, 18, 19:
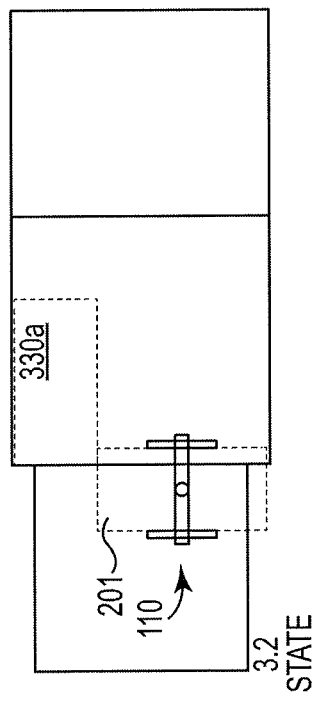
Figures 3, 4, 5, 6, 7, 8, 9, 10, 11, 12, 13, 14, 15, 16, 17, 18, 19, 20:
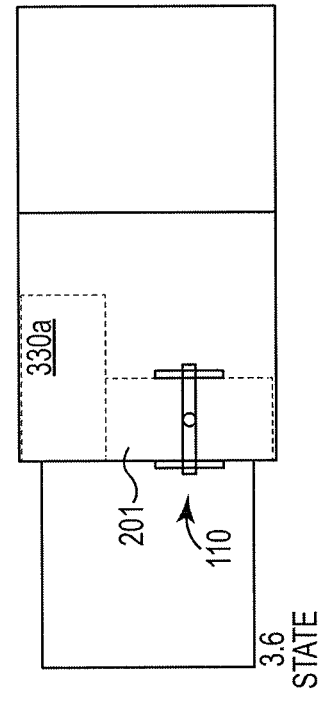
Figures 3, 4, 5, 6, 7, 8, 9, 10, 11, 12, 13, 14, 15, 16, 17, 18, 19, 20, 21:
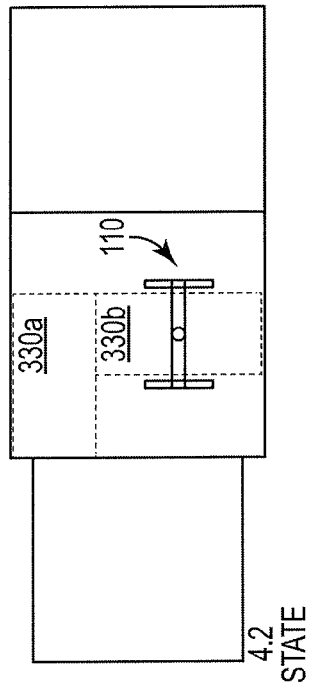
Figures 3, 4, 5, 6, 7, 8, 9, 10, 11, 12, 13, 14, 15, 16, 17, 18, 19, 20, 21, 22:
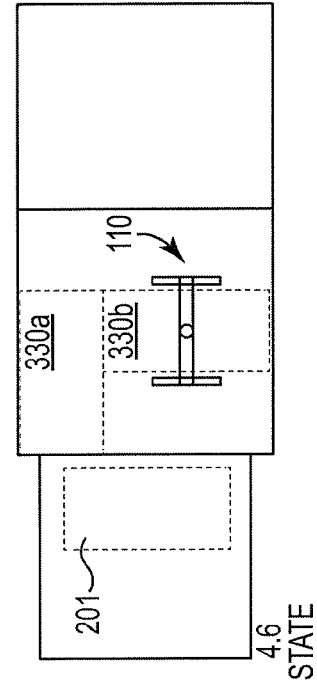
Figures 3, 4, 5, 6, 7, 8, 9, 10, 11, 12, 13, 14, 15, 16, 17, 18, 19, 20, 21, 22, 23:
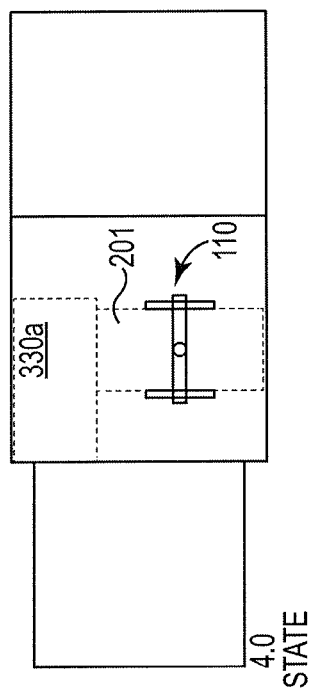
Figures 3, 4, 5, 6, 7, 8, 9, 10, 11, 12, 13, 14, 15, 16, 17, 18, 19, 20, 21, 22, 23, 24:
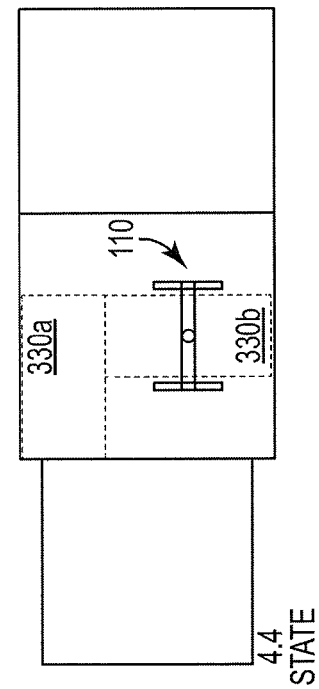
Figures 3, 4, 5, 6, 7, 8, 9, 10, 11, 12, 13, 14, 15, 16, 17, 18, 19, 20, 21, 22, 23, 24, 25:
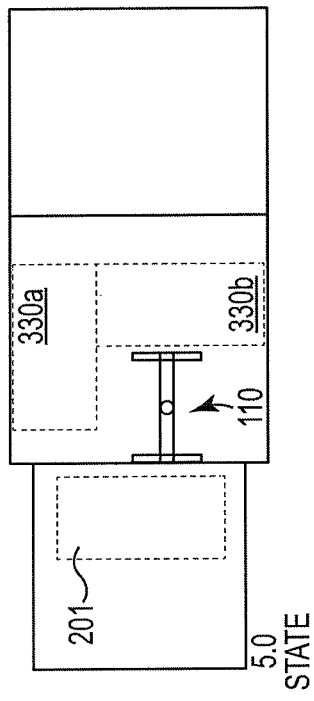
Figures 3, 4, 5, 6, 7, 8, 9, 10, 11, 12, 13, 14, 15, 16, 17, 18, 19, 20, 21, 22, 23, 24, 25, 26, 27:
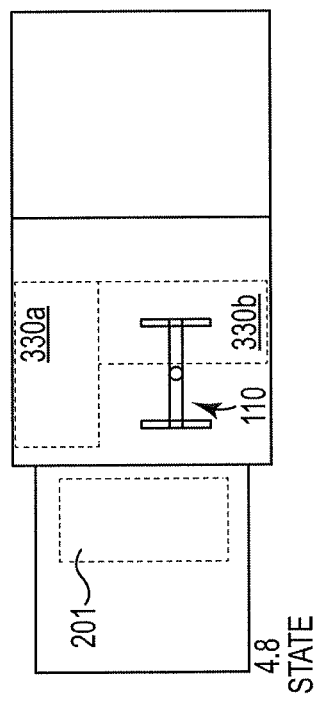
Figures 3, 4, 5, 6, 7, 8, 9, 10, 11, 12, 13, 14, 15, 16, 17, 18, 19, 20, 21, 22, 23, 24, 25, 26:
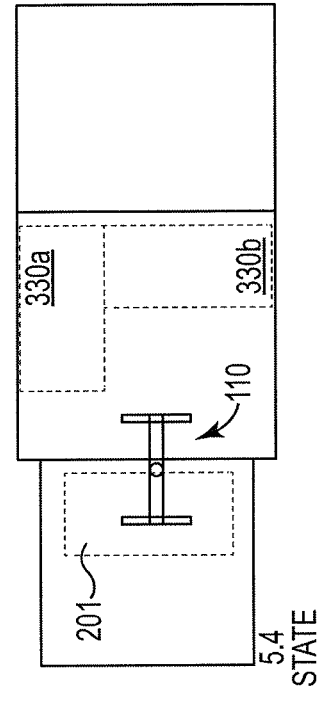
Figures 3, 4, 5, 6, 7, 8, 9, 10, 11, 12, 13, 14, 15, 16, 17, 18, 19, 20, 21, 22, 23, 24, 25, 26, 27, 28:
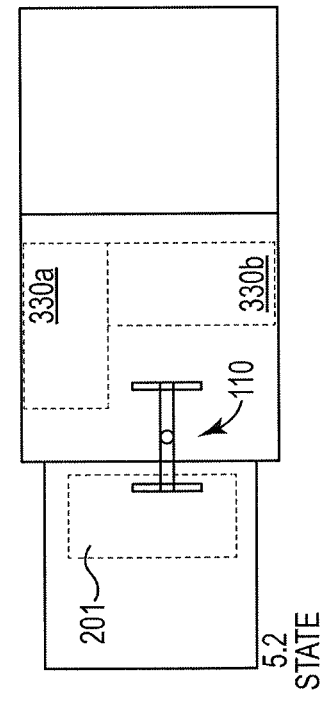
Figures 3, 4, 5, 6, 7, 8, 9, 10, 11, 12, 13, 14, 15, 16, 17, 18, 19, 20, 21, 22, 23, 24, 25, 26, 27, 28, 29:
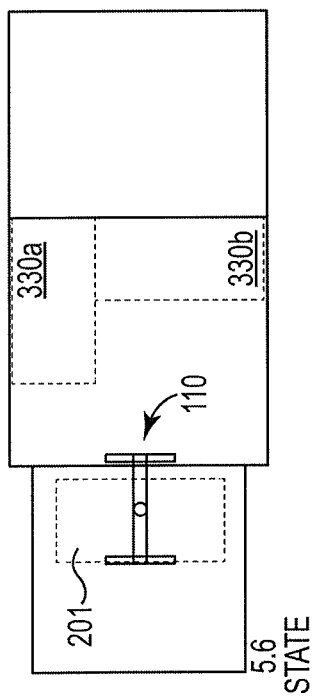
Figures 3, 4, 5, 6, 7, 8, 9, 10, 11, 12, 13, 14, 15, 16, 17, 18, 19, 20, 21, 22, 23, 24, 25, 26, 27, 28, 29, 30:
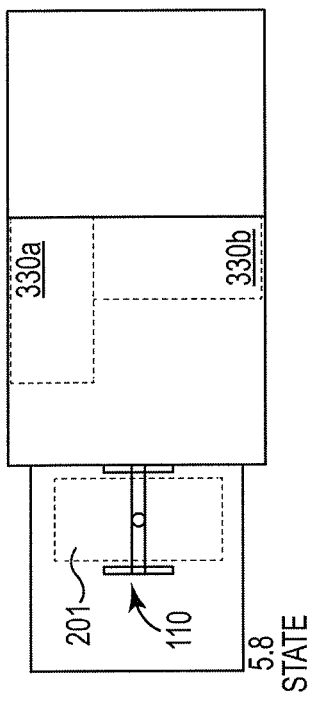
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31:
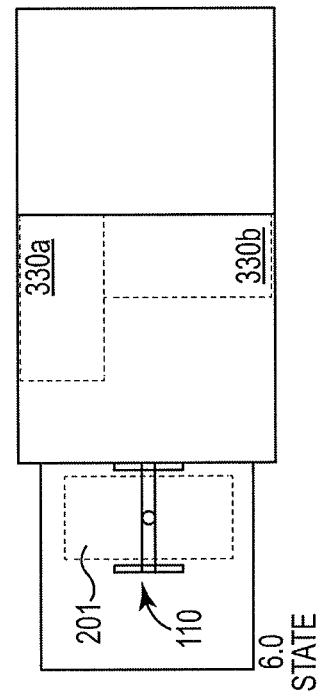
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
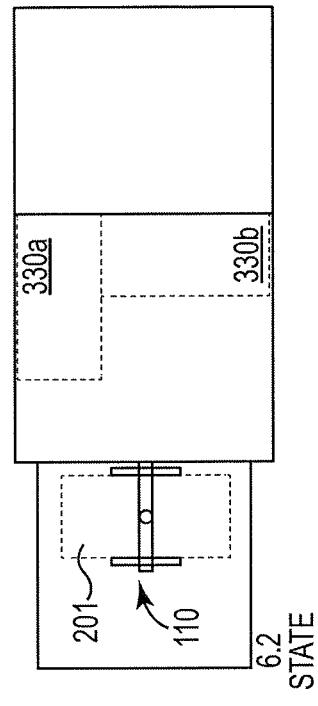
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
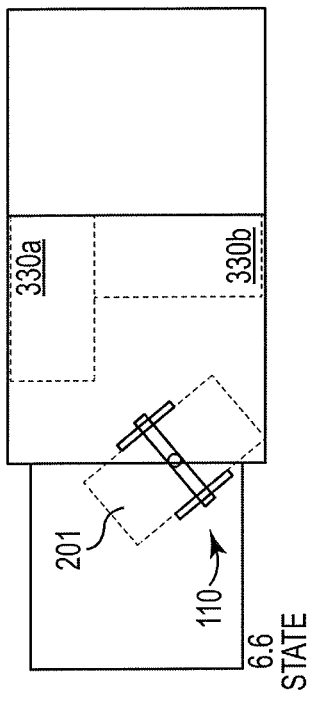
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
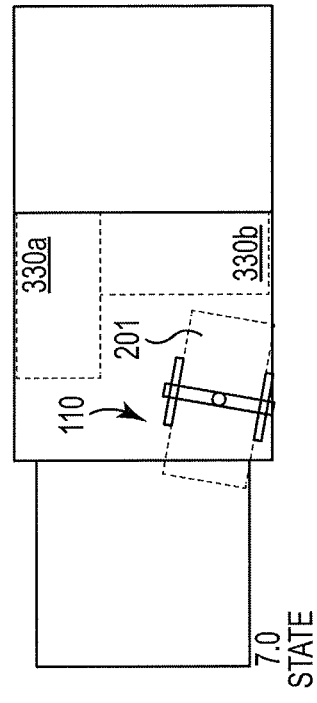
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
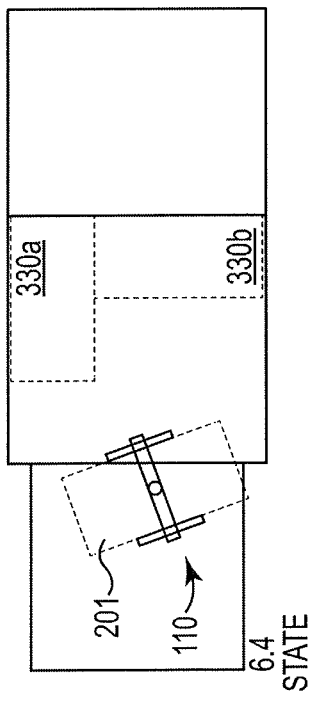
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
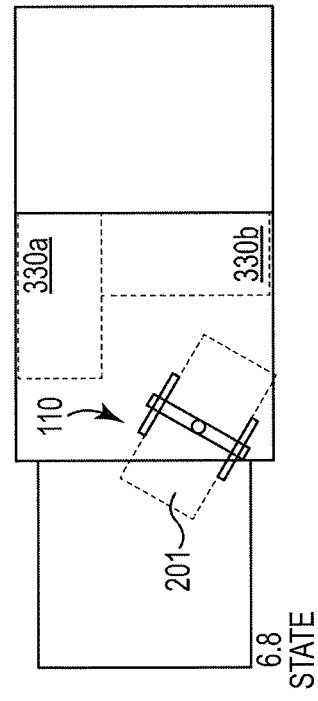
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
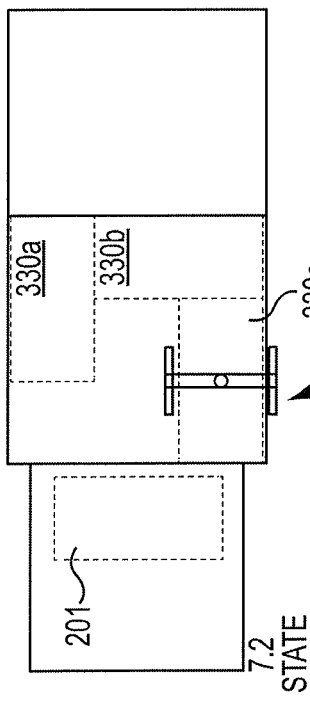
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
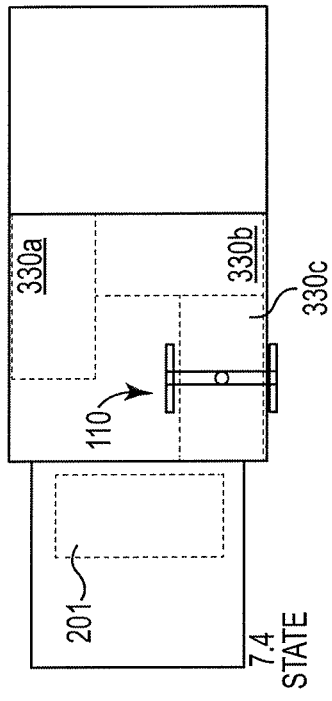
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
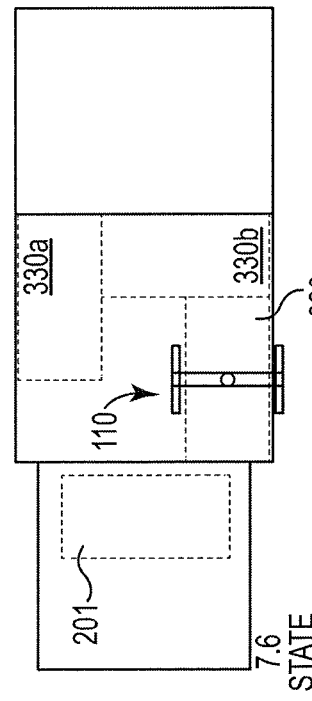
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
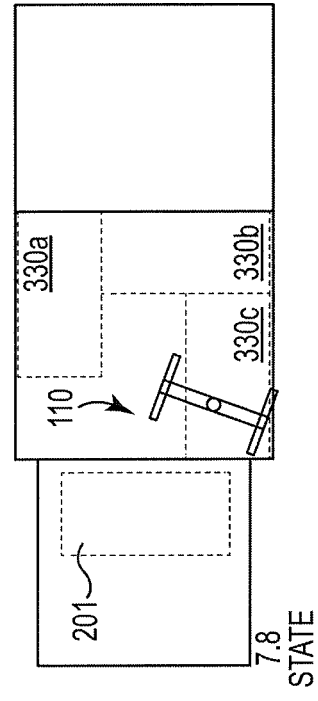
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
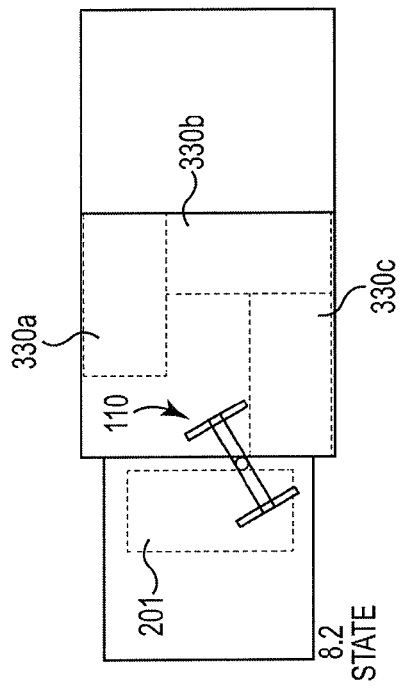
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
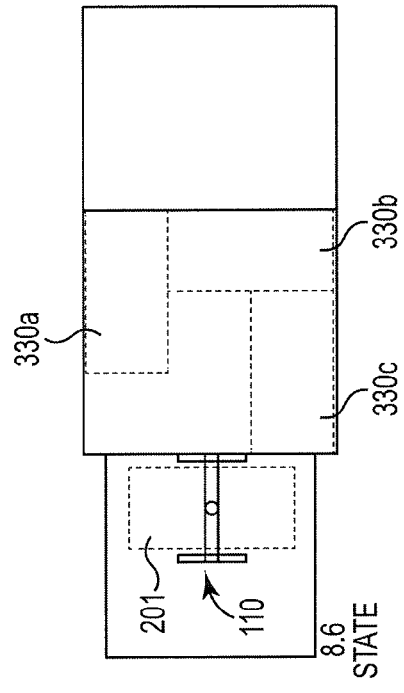
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
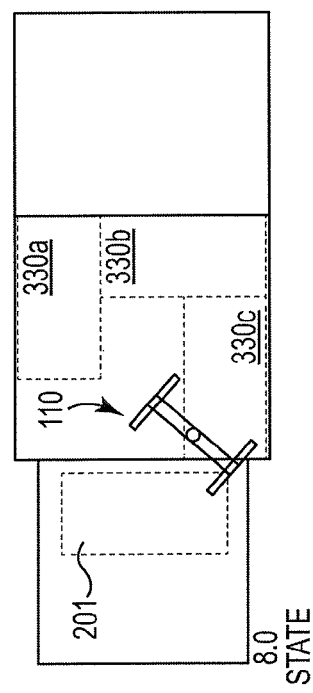
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
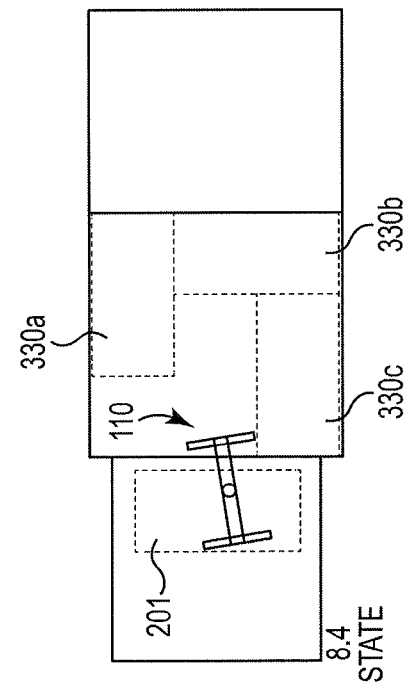
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
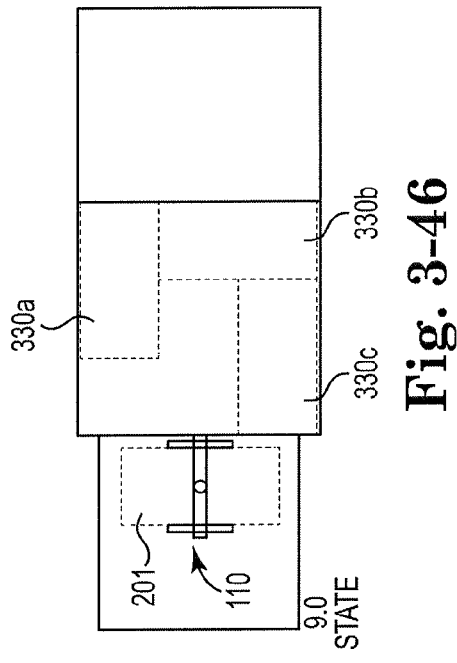
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
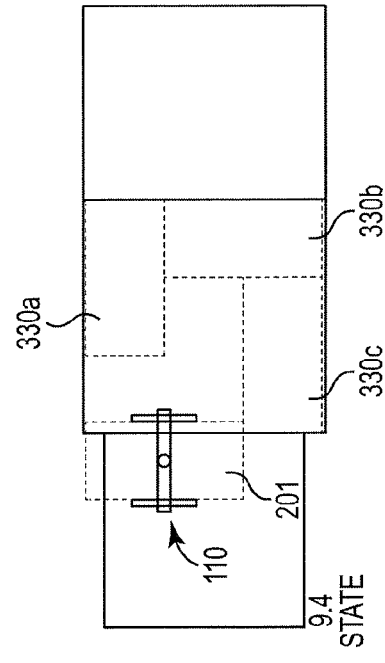
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
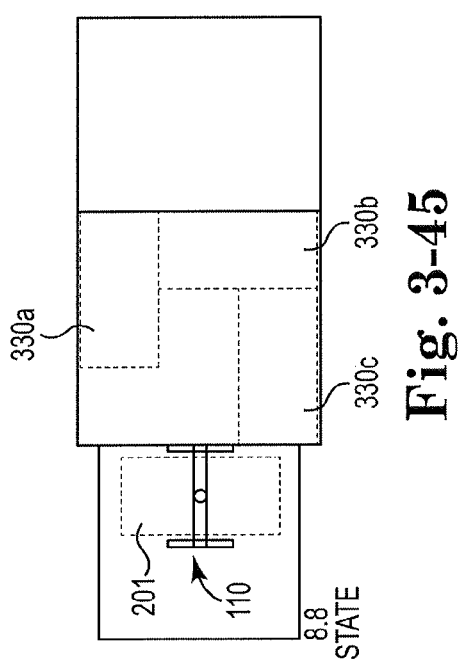
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
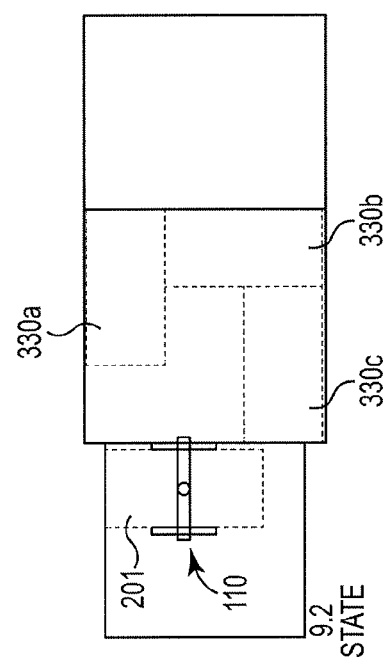
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
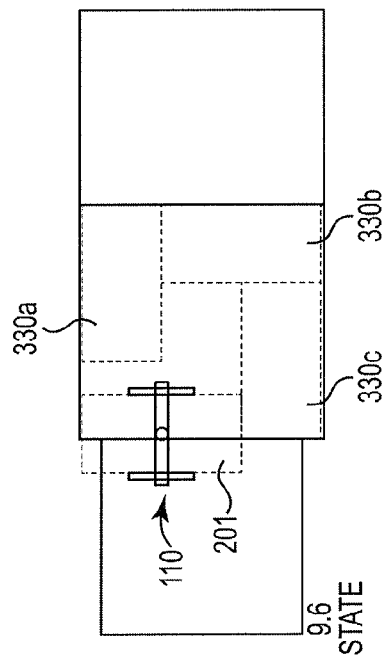
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
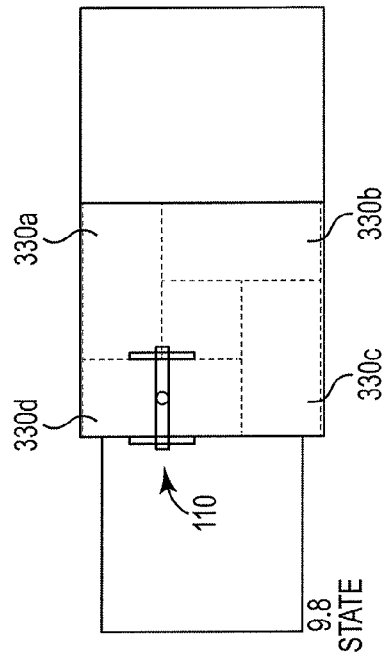
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
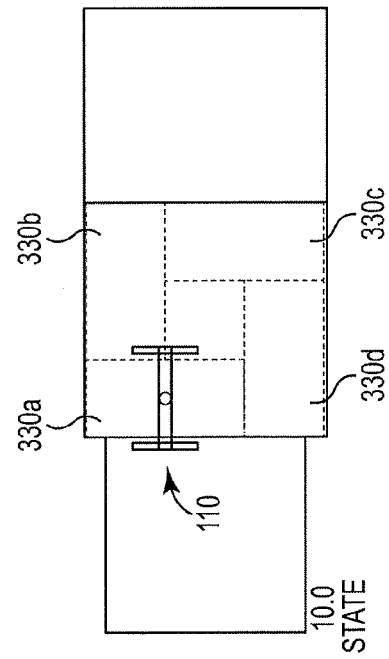
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
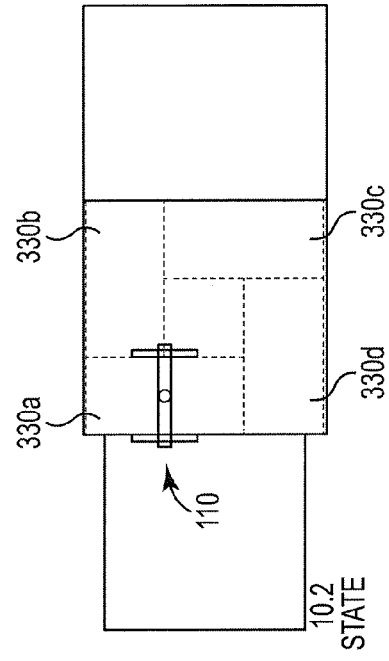
Figures 1, 4:
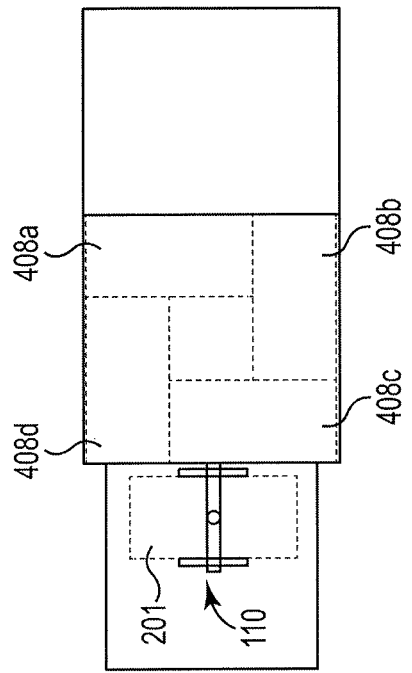
Figures 2, 4:
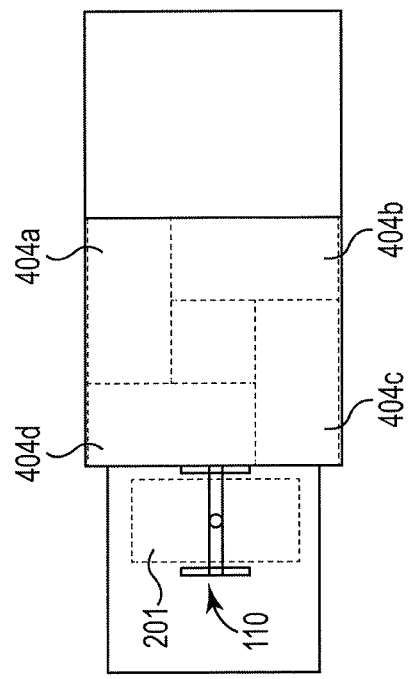
Figure 5:
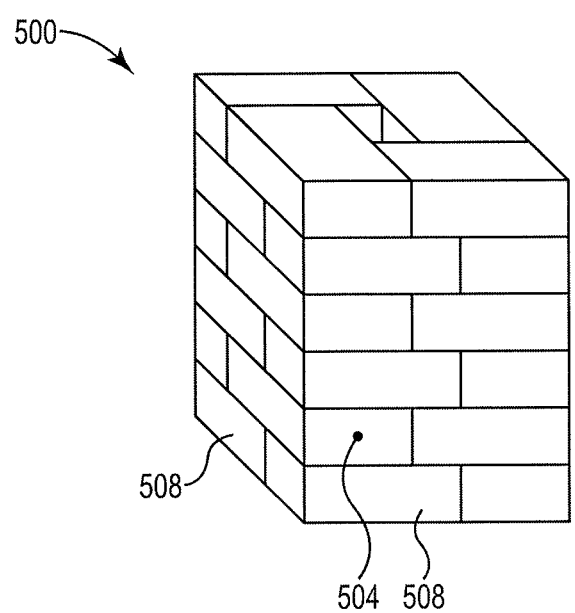

As further described with respect to FIG. 3, the method of layering or tiering can operate in conjunction with receipt of incoming bundles 201 on the conveyor 130, and separately from squaring-up of layers or tiers by devices or structures downstream from the conveyor 130 and the bundle pick area 210. This has the effect that the conveyor 130 and the robot 110 can operate at a first speed, optimized to pick up bundles 201 from the conveyor 130 and place them into the tier squaring area 230. Similarly, this has the effect that the tier squaring area 230, and accompanying squaring-up elements, can operate at a second speed, optimized to square up layers or tiers after bundles 201 have been placed in them.

For example, if bundles 201 arrive on the conveyor 130 at a certain speed, the robot 110 can move those bundles 201 from the bundle pick area 210 at that speed (or faster). While those bundles 201 are being moved, devices in the tier squaring area 230 can be operating to square up layers or tiers. Moving bundles 201 from the bundle pick area 210 does not have to wait for the squaring-up operation. This can provide an improvement in speed over performing the operation of moving bundles 201 and squaring-up layers or tiers with the same devices or in the same area.

Example Method of Palletizing

FIG. 3-1 through 3-52 (collectively referred to as FIG. 3) show a conceptual drawing of a method of layering or tiering.

A method of using an example system is described herein. In one embodiment, the method steps can be performed in an order as described herein. However, in the context of the invention, there is no particular requirement for any such limitation. For example, the method steps can be performed in another order, in a parallel or pipelined manner, or otherwise. For another example, while this example discusses building a tier and then sending the tier to a squaring area, the bundle could be sent to a squaring unit and the tier constructed at or near the squaring unit.

In this description, where the "method" is said to arrive at a state or perform an action, that state is arrived at, or that action is performed, by one or more machines associated with performing the method. In one embodiment, the method can be performed, at least in part, by a control device separate from the machines in the production line. In alternative embodiments, the method 300 can be performed by one or more machines in a production system. For example, one or more such machines can operate in conjunction or cooperation, or each performing one or more parts of the method.

Similarly, although one or more actions can be described herein as being performed by a single device, in the context of the invention, there is no particular requirement for any such limitation. For example, the one or more devices can include a cluster of devices, not necessarily all similar, by which actions are performed. Also, while this application generally describes one or more method steps as distinct, in the context of the invention, there is no particular requirement for any such limitation. For example, the one or more method steps could include common operations, or could even include substantially the same operations.

Although the operation of the method is generally shown in FIG. 3 looking from the top down, no limitation should be read into the method or the invention due to this form of description.

METHOD BEGINS. In one embodiment, at a state 0.0 shown in FIG. 3-1, the robot 110 is holding an incoming bundle (a "first bundle") 201, while a tier 320 is conveyed away from the tier build area 220 by the first tier conveyor 170 into the tier squaring area 230. For example, the tier 320 can include a set of arranged bundles 201 in designated locations 330a, 330b, 330c, and 330d. In such examples, the set of arranged bundles 201 can have been placed in those designated locations by the robot 110, using one or more bundles 201 that arrived earlier.

In one embodiment, the tier squaring area 230 can be disposed, as described above, to square up the tier 320. For example, the tier 320 can be nudged against a barrier, or a squaring element can be nudged against a portion of the tier 320, with the effect that objects in the tier 320 can be arranged into a shape that has relatively straight sides and does not have any extrusions.

In one embodiment, the robot 110 can include a pair of grippers 310a, 310b, coupled to a holding device 310c, and coupled to a lifting element 310d. For a first example, the grippers 310a, 310b might operate by inserting tongs underneath the bundles 201. For a second example, the lifting element 310*d* might include a hydraulic lift coupled to a crane or other relatively static holding element.

FIRST BUNDLE. In one embodiment, at a sequence of states 0.2 through 1.0, shown in FIG. 3-2 through FIG. 3-6, the robot 110 moves the first bundle 201 into a first position in the tier build area 220. For example, the robot 110 can pick up or otherwise grip the first bundle 201 and move the bundle 201 to a first designated location 330*a*.

In one embodiment, at a state 1.0 shown in FIG. 3-6, the robot 110 releases the first bundle 201 at the first designated location 330*a*, such as by releasing the grippers 310*a*, 310*b*.

In one embodiment, at a state 1.2 shown in FIG. 3-7 and a state 1.4 shown in FIG. 3-8, the robot 110 disengages from the first bundle 201, such as by raising itself above a highest element of the first bundle 201.

SECOND BUNDLE. In one embodiment, at sequence of states 1.6 through 2.4 shown in FIG. 3-9 through FIG. 3-13, the robot 110 moves to a location and orientation of a second incoming bundle 201.

In one embodiment, at a state 2.6 shown in FIG. 3-14 and a state 2.8 shown in FIG. 3-15, the robot 110 grips the second incoming bundle 201, while the tier 320 can remain stable in the tier build area 220.

In one embodiment, at a sequence of states 3.0 through 4.0 shown in FIG. 3-16 through FIG. 3-21, the robot 110 moves the second incoming bundle 201 into a second position in the tier build area 220. For example, the robot 110 can pick up or otherwise grip the second bundle 201 and move the second bundle 201 to a second designated location 330*b*.

In one embodiment, at a state 4.2 shown in FIG. 3-22 and a state 4.4 shown in FIG. 3-23, the robot 110 similarly releases the second bundle 201 at the second designated location 330*b*, such as by releasing the grippers 310*a*, 310*b*.

In one embodiment, at a state 4.6 shown in FIG. 3-24, the robot 110 similarly disengages from the second bundle 201, such as by raising itself above a highest element of the second bundle 201.

THIRD BUNDLE. In one embodiment, at a sequence of states 4.8 through 5.8 shown in FIG. 3-25 through FIG. 3-30, the robot 110 similarly moves to a location and orientation of a third incoming bundle 201. For example, the tier 320 can be moved by the tier build conveyer 170 while the robot 110 is moving and the third bundle 201 remains stable in the bundle pick area 210.

In one embodiment, at a state 6.0 shown in FIG. 3-31 and a state 6.2 shown in FIG. 3-32, the robot 110 grips the third incoming bundle 201, while the tier 320 remains stable in the tier build area 220.

In one embodiment, at a sequence of states 6.4 through 7.2 shown in FIG. 3-33 through 3-37, the robot 110 moves the third incoming bundle 201 into a third position in the tier build area 220. For example, the robot 110 can pick up or otherwise grip the third bundle 201 and move the third bundle 201 to a third designated location 330*c*.

In one embodiment, at a state 7.2 shown in FIG. 3-37 and a state 7.4 shown in FIG. 3-38, the robot 110 similarly releases the third bundle 201 at the third designated location 330*c*, such as by releasing the grippers 310*a*, 310*b*.

In one embodiment, at a state 7.6 shown in FIG. 3-39, the robot 110 similarly disengages from the third bundle 201, such as by raising itself above a highest element of the third bundle 201.

FOURTH BUNDLE. In one embodiment, at a sequence of states 7.8 through 8.6 shown in FIG. 3-40 through FIG. 3-44, the robot 110 similarly moves to a location and orientation of a fourth incoming bundle 201. For example, the tier 320 can remain stable in the tier build area 220 while the robot 110 is moving.

In one embodiment, at a state 8.8 shown in FIG. 3-45 and a state 9.0 shown in FIG. 3-46, the robot 110 grips the fourth incoming bundle 201, while the tier 320 remains stable in the tier build area 220.

In one embodiment, at a sequence of states 9.0 through 9.8 shown in FIG. 3-46 through 3-50, the robot 110 moves the fourth incoming bundle 201 into a fourth position in the tier build area 220. For example, the robot 110 can pick up or otherwise grip the fourth bundle 201 and move the fourth bundle 201 to a fourth designated location 330*d*.

In one embodiment, at a state 10.0 shown in FIG. 3-51 and a state 10.2 shown in FIG. 3-52, the robot 110 similarly releases the fourth bundle 201 at the fourth designated location 330*c*, such as by releasing the grippers 310*a*, 310*b*.

In one embodiment, at a state 10.2 shown in FIG. 3-52, the robot 110 similarly disengages from the fourth bundle 201, such as by raising itself above a highest element of the fourth bundle 201.

METHOD ENDS AND REPEATS. In one embodiment, the method repeats so long as there are further incoming bundles 201.

LAYER FORMATION IN THE TIER BUILD AREA. In another embodiment, the system is configured to form bundle layers in the tier build area 220. In this embodiment, the robot 110 forms a multi-layered tier 320 of bundles 201 by stacking two or more layers of bundles 201 on top of each other in the tier build area 220. Once the robot 110 builds up a desired number of layers, the multi-layered tier 320 may be moved out of the tier build area 220 and into the tier squaring area 230. In one embodiment, two or more multi-layered tier 320 of bundles 201 may be gathered together and combined into a completed stack in the stack build area 250.

Turning now to specific methods of building a multi-layered tier 320 in the in the tier build area 220, reference is again made to FIG. 3. In one implementation, the robot 110 stacks bundles 201 to a desired height in a particular designated location before the robot 110 moves onto stacking in the next designated location. For example, in connection with building a two-layered tier 320 of bundles 201 in the tier build area 220, the robot 110 may begin by stacking a first and a second bundle 201 on top of each other in the first designated location 330*a*. Stacking the first and second bundle may include executing and then repeating the sequence of states 0.2 through 1.4, shown in FIG. 3-2 through FIG. 3-8. The robot 110 then stacks a third and a fourth bundle 201 on top of each other in the second designated location 330*b* by, for example, executing and then repeating the sequence of states 1.6 through 4.6 shown in FIG. 3-9 through FIG. 3-24. Following this, the robot 110 stacks a fifth and a sixth bundle 201 on top of each other in the third designated location 330*c* by, for example, executing and then repeating the sequence of states 4.8 through 7.6 shown in FIG. 3-25 through FIG. 3-39. Here, the two-layered tier 320 of bundles 201 can be moved by the tier build conveyer 170 while the robot 110 is moving and the fifth bundle 201 remains stable in the bundle pick area 210. Finally, the robot 110 stacks a seventh and an eighth bundle 201 on top of each other in the fourth designated location 330*d* by, for example, executing and then repeating the sequence of states 7.8 through 10.2 shown in FIG. 3-40 through FIG. 3-52.

In another implementation, the robot 110 stacks bundles 201 to a desired height in the first and second designated locations 330*a-b* before the robot 110 moves onto stacking in the third and fourth designated locations 330*c-d*. For example, in connection with building a two-layered tier 320 of bundles 201 in the tier build area 220, the robot 110 may begin by placing a first bundle 201 in the first designated location 330*a* and a second bundle 201 in the second designated location 330*b*. Placing the first and second bundles may include executing the sequence of states 0.2 through 4.6, shown in FIG. 3-2 through FIG. 3-24. The robot 110 then stacks a third bundle 201 on top of the first bundle 201 in the first designated area 330*a* and a fourth bundle 201 on top of the second bundle 201 in the second designated area 330*b* by, for example, executing a second time the sequence of states 0.2 through 4.6, shown in FIG. 3-2 through FIG. 3-24. Following this, the robot 110 places a fifth bundle 201 in the third designated location 330*c* and a sixth bundle 201 in the fourth designated location 330*d* by, for example, executing the sequence of states 4.8 through 10.2, shown in FIG. 3-25 through FIG. 3-52. Here, the two-layered tier 320 of bundles 201 can be moved by the tier build conveyer 170 while the robot 110 is moving and the fifth bundle 201 remains stable in the bundle pick area 210. Finally, the robot 110 stacks a seventh bundle 201 on top of the fifth bundle 201 in the third designated area 330*c* and an eighth bundle 201 on top of the sixth bundle 201 in the fourth designated area 330*d* by, for example, executing a second time the sequence of states 4.8 through 10.2, shown in FIG. 3-25 through FIG. 3-52.

In still another implementation, the robot 110 is configured to place bundles 201 on the far side of the tier build area 220 such that the intermediate operation of the tier build conveyer 170 moving a partially completed tier 320 may be omitted. Thus, in one respect, the robot 110 may be configured to place bundles 201 in the first designated locations 404*a-d* shown in FIG. 4-1. In another respect, the robot 110 may be configured to place bundles 102 in the second designated locations 408*a-d* shown in FIG. 4-2. As can be seen, the first designated locations 404*a-d* do not overlap with or are otherwise offset from the second designated locations 408*a-d*. More specifically, the second designated locations 408*a-d* are shifted 90 degrees about a central axis with respect to the positions of the first designated locations 404*a-d*. In one embodiment, the robot 110 builds a multilayered tier of bundles 201 by alternating between the first designated locations 404*a-d* and the second designated locations 408*a-d*. For example, in connection with building a two-layered tier 320 of bundles 201 in the tier build area 220, the robot 110 may build a first layer by placing a bundle 201 in each of the four designated locations 404*a-d* shown in FIG. 4-1. Following this, the robot 110 may build a second layer on top of the first layer by placing a bundle 201 in each of the four designated locations 408*a-d* shown in FIG. 4-2. Due to the offset between the first designated locations 404*a-d* and the second designated locations 408*a-d*, each bundle in the second layer is placed on a portion of more than one bundle in the first layer.

The multilayered tier formation methods are discussed in connection with two layered tiers by way of example and not limitation. It should be appreciated that the tier 320 may be built to any desired height prior to tier 320 being moved out of the tier build area 220. Thus, in one embodiment, the tier 320 may be moved out of the tier build area 220 once the second layer is in place. In other embodiments, additional layers are added to the tier 320 before the tier is moved out of the tier build area 220. By way illustration, FIG. 5 shows perspective view of a six-layered tier 500 built in the tier build area 220. The six-layered tier 500 is built using the method discussed above that alternates between the designated locations 404*a-d* shown in the FIG. 4-1 and the designated locations 408*a-d* shown in the FIG. 4-2. The six-layered tier 500 shown in FIG. 5 illustrates the pattern of bundles that is created by the offset between the first designated locations 404*a-d* and the second designated locations 408*a-d*. For example, a second layer bundle 504 is placed on top of a portion of two first layer bundles 508. This orientation of bundles may provide stability to a multilayered tier.

While this method of operation has been primarily described with respect to bundles in the production line, in the context of the invention, there is no particular requirement for any such limitation. For example, methods of operation can be performed with respect to individual objects, or sets of objects, or other elements that might arrive and for which it is desirable to move and organize those elements.

Similarly, while this method of operation has been primarily described with respect to one robotic device and one production line, in the context of the invention, there is no particular requirement for any such limitation. For example, methods of operation can be performed with respect to multiple robotic devices, multiple production lines, multiple controllers, multiple types of layers or tiers. Moreover, methods of operation can be performed with respect to crossover between or among multiple robotic devices, multiple production lines, multiple controllers, multiple types of layers or tiers.

Alternative Embodiments.

After reading this application, those skilled in the art would recognize many of the advantages of this description, and would recognize that various changes may be made in the form, construction, and arrangement of the components without departing from the scope or spirit of the subject matter or without sacrificing its advantages. Those embodiments described herein are merely explanatory and illustrative. While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

Aspects of the embodiments described herein could be provided as a computer program product, such as may include a computer-readable storage medium or a non-transitory machine-readable medium maintaining instructions interpretable by a computer or other electronic device, such as to perform one or more processes. A non-transitory machine-readable medium includes any mechanism for storing information in a form (including a processing application or software) readable or interpretable by a machine (such as a computer). The non-transitory machine-readable medium may take the form of, but is not limited to, any known storage technique, including magnetic storage media, optical storage media, magneto-optical storage media; read only memory (ROM); random access memory (RAM); erasable programmable memory (including EPROM and EEPROM); flash memory; and otherwise.

The invention claimed is:

1. A palletizing method, comprising:
   determining by a vision system a position of one or more bundles on a conveyor;
   directing movement of a robot by a control system in communication with the vision system so as to move the robot relative to the conveyor and align the robot to a position corresponding with the position of the one or more bundles on the conveyor as the bundles are conveyed on the conveyor;
   directing the robot by the control system to seize the one or more bundles; and
   directing the robot by the control system to place the one or more bundles in a tier.

2. The palletizing method of claim 1, wherein the position of the one or more bundles on the conveyor includes at least a location.

3. The palletizing method of claim 1, wherein the position of the one or more bundles on the conveyor includes at least an orientation.

4. The palletizing method of claim 1, wherein the operation of directing the robot by the control system to place the one or more bundles in a tier comprises placing the one or more bundles in a first tier in a tier build area; and
   the palletizing method further comprising simultaneously directing a tier squaring operation for a second tier of bundles in a tier squaring area, the second tier of bundles having been previously formed by the robot in the tier build area.

5. The palletizing method of claim 1, wherein the operation of directing the robot by the control system to place the one or more bundles in a tier comprises directing the robot to place a first, second, third and fourth bundle in respectively first, second, third, and fourth designated locations in a tier build area; and
   the palletizing method further comprising directing a tier build conveyer, between the operations of the robot that place the second and third bundles, to move the first and second bundles so as to make room for the third and fourth bundles in the tier build area.

6. The palletizing method of claim 1, wherein the operation of directing the robot by the control system to place the one or more bundles in a tier comprises:
   directing the robot to place a first plurality bundles in a first plurality of designated location to form a first layer of bundles in the tier build area; and
   directing the robot to place a second plurality bundles in a second plurality of designated location to form a second layer of bundles on top of the first layer of bundles in the tier build area.

7. The palletizing method of claim 6, wherein the second plurality of Designated locations is offset from the first plurality of designated locations such that each bundle in the second layer is placed on a portion of more than one bundle in the first layer.

8. The palletizing method of claim 1, wherein the operation of directing the robot by the control system to place the one or more bundles in a tier comprises building at least two multilayered tiers of bundles in a tier build area; and
   the palletizing method further comprising building a completed stack of bundles by combining the at least two multilayered tiers of bundles in a stack build area.

9. A robotic component of a palletizer system, comprising:
   a vision system that determines a position of a bundle on a conveyor;
   a robot that seizes the bundle, removes the bundle from the conveyor, and places the bundle in a tier build area; and
   a robot controller that directs the robot responsive to the position of the bundle as determined by the vision system in a manner so as to move the robot relative to the conveyor and align the robot to a position corresponding to the position of the bundle on the conveyor as the bundles are conveyed on the conveyor.

10. The robotic component of claim 9, wherein the vision system determines the position of the bundle on the conveyor by identifying the relative location of the bundle with respect to the robot.

11. The robotic component of claim 9, wherein the vision system determines the position of the bundle on the conveyor by identifying the relative orientation of the bundle with respect to the robot.

12. The robotic component of claim 9, wherein the bundle is one of a plurality of bundles on the conveyor, the plurality of bundles including at least a second bundle adjacent to the first bundle; and
    the vision system determines the position of the bundle by identifying an amount and shape of a space between the bundle and the second bundle.

13. The robotic component of claim 9, further comprising:
    a conveyer tracking system that moves the robot with respect to the conveyer so as to align the robot with the bundle as the bundle is moved by the conveyer.

14. The robotic component of claim 9, wherein the bundle is one of a plurality of bundles on the conveyer; and
    the robot forms a tier of bundles by placing the bundle and a number of additional bundles in the tier build area.

15. The robotic component of claim 14, wherein the tier is a multilayered tier that the robot forms by placing at least a first layer of bundles in the tier build area and a second layer of bundles on top of the first layer of bundles.

16. A palletizer, comprising:
    a robotic component that seizes incoming bundles from a conveyer, reorients the bundles relative to a position of the incoming bundles from the conveyor as the robotic component removes the bundles from the conveyor, and places the bundles in a pre-selected pattern in a tier build area to form a tier of bundles after removing the bundles from the conveyor; and
    a palletizer control system that controls the robotic component and a tier squaring operation that occurs in a tier squaring area;
    wherein control of the robotic component is independent from that of the tier squaring operation such that the palletizer control system directs the robotic component to build a first a tier of bundles in the tier build area and simultaneously directs a tier squaring operation for a second tier of bundles in the tier squaring area, the second tier of bundles having been previously formed by the robot in the tier build area.

17. The palletizer of claim 16, further comprising:
    a tier build conveyer that moves completed tiers from the tier build area downstream to the tier squaring area.

18. The palletizer of claim 17, wherein the palletizer control system builds a tier of bundles in the tier build area by a series of commands, comprising:

a command to the robotic component to place a first bundle in a first designated location in the tier build area;

a command to the robotic component to a place a second bundle in a second designated location in the tier build area;

a command to the tier build conveyer to move the first and second bundles downstream so as to make room for a third and fourth bundle in the tier build area;

a command to the robotic component to place the third bundle in a third designated location in the tier build area; and a command to the robotic component to place the fourth bundle in a fourth designated location in the tier build area.

19. The palletizer of claim 18, wherein the palletizer control system builds a multilayered tier of bundles in the tier build area by a series of commands, comprising:

a command to the robotic component to place a first plurality bundles in a first plurality of designated location to form a first layer of bundles in the tier build area; and a command to the robotic component to place a second plurality bundles in a second plurality of designated location to form a second layer of bundles on top of the first layer of bundles in the tier build area wherein the second plurality of designated locations is offset from the first plurality of designated locations such that each bundle in second layer is placed on a portion of more than one bundle in the first layer.

20. The palletizer of claim 19, wherein the palletizer control system builds a completed stack of bundles by combining at least two multilayered tiers of bundles in a stack build area.

* * * * *